(12) United States Patent
Wang et al.

(10) Patent No.: US 8,233,853 B2
(45) Date of Patent: Jul. 31, 2012

(54) TRANSMISSION CIRCUIT FOR RADIO FREQUENCY SIGNALS AND METHOD FOR TRANSMITTING RADIO FREQUENCY SIGNALS

(75) Inventors: Jian Min Wang, ShenZhen (CN); Wei Dong Wang, Shenzhen (CN); Yao Xing, Shenzhen (CN)

(73) Assignee: Siemens Aktiengesellschaft, Munich (DE)

(*) Notice: Subject to any disclaimer, the term of this patent is extended or adjusted under 35 U.S.C. 154(b) by 869 days.

(21) Appl. No.: 12/354,320

(22) Filed: Jan. 15, 2009

(65) Prior Publication Data

US 2009/0186586 A1 Jul. 23, 2009

(30) Foreign Application Priority Data

Jan. 15, 2008 (CN) .......................... 2008 1 0000732

(51) Int. Cl.
*H03C 1/62* (2006.01)
(52) U.S. Cl. ............... 455/115.1; 455/114.2; 455/67.11; 455/501; 455/63.1; 455/67.13; 455/570; 455/106; 455/107
(58) Field of Classification Search ............... 455/114.2, 455/115.1, 67.11, 501, 63.1, 67.13, 570, 455/106, 107
See application file for complete search history.

(56) References Cited

U.S. PATENT DOCUMENTS

| 5,872,537 A * | 2/1999 | Siweris .......................... 342/128 |
| 7,616,934 B2 * | 11/2009 | Macphail ................... 455/248.1 |
| 2004/0253939 A1 * | 12/2004 | Castaneda et al. ............ 455/341 |

\* cited by examiner

*Primary Examiner* — Junpeng Chen
(74) *Attorney, Agent, or Firm* — Schiff Hardin LLP

(57) ABSTRACT

A transmission circuit for radio frequency signals has a power mixer and includes a radio frequency input port, a first radio frequency output port, a second radio frequency output port, and a dummy load port. The transmission circuit also has a first switch unit and a second switch unit. The first switch unit is connected to the first radio frequency output port and outputs the radio frequency signals which are emitted from the first radio frequency output port or reflects the radio frequency signals which are emitted from the first radio frequency output port back to the first radio frequency output port. The second switch unit is connected to the second radio frequency output port and outputs the radio frequency signals which are emitted from the second radio frequency output port, or reflects the radio frequency signals which are emitted from the second radio frequency output port back to the second radio frequency output port. The radio frequency signals reflected to the radio frequency input port by the first switch unit and the radio frequency signals reflected to said radio frequency input port by the second switch unit cancel each other. The transmission circuit has reduced complexity and cost.

11 Claims, 2 Drawing Sheets

TRANSMISSION CIRCUIT FOR RADIO FREQUENCY SIGNALS AND METHOD FOR TRANSMITTING RADIO FREQUENCY SIGNALS

BACKGROUND OF THE INVENTION

1. Field of the Invention

The present invention relates to the technology field of radio frequency signal transmission and, particularly, to a transmission circuit for radio frequency signals and a method for transmitting radio frequency signals.

2. Description of the Prior Art

In current magnetic resonance imaging systems, a transmitting link of radio frequency signals for a body coil is shown in FIG. 1. Referring to FIG. 1, the transmitting link primarily includes a radio frequency amplifier 101, a transmitting antenna shift switch 102, a power mixer 103, a transmitting antenna 104, and a power load 105. In which case, the main role of the power amplifier 101 is to amplify the radio frequency signals to be transmitted. The main role of the transmitting antenna shift switch 102 is to switch the output power of the radio frequency amplifier 101 to the power mixer 103 or the power load 105, namely, to transmit the output power of the radio frequency amplifier 101 to a radio frequency input port 11 of the power mixer 103, so as to further provide it to the transmitting antenna 104 for transmitting; or to transmit the output power of the radio frequency amplifier 101 to the power load 105, so as to calibrate the radio frequency amplifier 101 by measuring. The main role of the power mixer 103 is to mix the radio frequency signals that are supplied as inputs from the transmitting antenna shift switch 102, so as to form the two orthogonal radio frequency signals, and to output them to the transmitting antenna 104 via the radio frequency output ports 12 and 13. The transmitting antenna 104 is mainly used for transmitting (emitting) the two channels of the radio frequency signals supplied thereto as inputs.

When the power mixer 103 transmits the two channels of the orthogonal radio frequency signals to the antenna via the radio frequency output ports 12 and 13, since the radio frequency device does not match or the reflection coefficients of multiple input ports of the transmitting antenna 104 are not the same, it will produce therefore a certain amount of reflected power, and this part of the reflected power is emitted to the transmitting antenna shift switch 102 from the dummy load port 14 of the power mixer 103. It is then switched to the power load 105 by the transmitting antenna shift switch 102 and is consumed there to avoid being returned to the radio frequency amplifier 101, which may damage the radio frequency amplifier 101.

In the transmitting link shown in FIG. 1, the transmitting antenna shift switch 102 not only switches the power signals that are emitted from the radio frequency amplifier 101 to the power mixer 103 or the power load 105, but also outputs the reflected power outputted from the dummy load port 14 of the power mixer 103 to the power load 105. Such a transmitting antenna shift switch 102 has high operating requirements, so its structure is relatively complicated, thereby leading to a relatively complicated transmitting link as shown in FIG. 1.

SUMMARY OF THE INVENTION

An object of the present invention is to provide a transmission circuit for radio frequency signals exhibiting reduced complexity for the transmission of such radio frequency signals. The present invention also provides a method for transmitting radio frequency signals utilizing a transmission circuit for radio frequency signals.

The transmission circuit for radio frequency signals in accordance with the present invention has a power mixer, this power mixer including a radio frequency input port, a first radio frequency output port, a second radio frequency output port and a dummy load port. Radio frequency signals reflected back to the power mixer from the first radio frequency output port and radio frequency signals reflected back to the power mixer from the second radio frequency output port cancel each other at the radio frequency input port, and are emitted as an output from the dummy load port. The transmission circuit for radio frequency signals further has a first switch unit and a second switch unit. The first switch unit is connected to the first radio frequency output port for emitting the radio frequency signals supplied from the first radio frequency output port, or for reflecting the radio frequency signals supplied from the first radio frequency output port back to the first radio frequency output port. The second switch unit is connected to the second radio frequency output port for emitting the radio frequency signals supplied from the second radio frequency output port, or for reflecting the radio frequency signals outputted from the second radio frequency output port back to the second radio frequency output port.

In the above technical solution, the first switch unit reflects the radio frequency signals emitted from the first radio frequency output port back to the first radio frequency output port by forming a short circuit in the first radio frequency output port, and the second switch unit reflects the radio frequency signals emitted from the second radio frequency output port back to the second radio frequency output port by forming a short circuit in the second radio frequency output port.

Preferably, the short circuit in the first switch unit and the second switch unit is realized by a connection to ground.

The first switch unit has a diode, with its anode connected to the first radio frequency output port and its cathode to ground, and when the diode is non-conducting, the radio frequency signals supplied from the first radio frequency output port are emitted as an output, and when it is conducting, the radio frequency signals supplied from the first radio frequency output port are reflected back to the first radio frequency output port. The second switch unit also has a diode, with its anode connected to the first radio frequency output port and its cathode to ground. When the diode is non-conducting, the radio frequency signals from the second radio frequency output port are emitted as an output. When it is conducting, the radio frequency signals supplied from the second radio frequency output port are reflected back to the second radio frequency output port.

Preferably, the first switch unit reflects the radio frequency signals from the first radio frequency output port back to the first radio frequency output port by making the first radio frequency output port an open circuit, and the second switch unit reflects the radio frequency signals from the second radio frequency output port back to the second radio frequency output port by making the second radio frequency output port an open circuit.

The first switch unit has a radio frequency switch, with one side thereof connected to the first radio frequency output port. When this radio frequency switch is closed, it emits, from the other side thereof, the radio frequency signals supplied from the first radio frequency output port, and when it is open, it reflects the radio frequency signals supplied from the first radio frequency output port back to the first radio frequency output port. The second switch unit can also have a radio frequency switch, with one side thereof connected to the second radio frequency output port. When this radio frequency switch is closed, it emits, from the other side thereof, the radio frequency signals supplied from the second radio frequency output port. When it is open, it reflects the radio frequency signals supplied from the second radio frequency output port back to the second radio frequency output port.

In the above technical solution, the power supplied as an output from the first radio frequency output port to the first switch unit and the power supplied as an output from the second radio frequency output port to the second switch unit are equal, and the reflectance of the first switch unit and that of the second switch unit are equal. Alternatively; the power supplied from the first radio frequency output port to the first switch unit and the power supplied from the second radio frequency output port to the second switch unit are not equal, and the reflectance of the first switch unit and that of the second switch unit are not equal.

In the above technical solution, the power mixer is either an active power mixer or a passive power mixer.

The above transmission circuit for radio frequency signals further has a radio frequency amplifier, a transmitting antenna and a power load, wherein, the output of the radio frequency amplifier is connected to the radio frequency input of said power mixer; the two inputs of the transmitting antenna are respectively connected to the first radio frequency output and the second radio frequency output of the power mixer, and the power load is connected to the port of the dummy load of the power mixer.

The present invention also provides a method for transmitting radio frequency signals which utilizes the abovementioned transmission circuit for radio frequency signals, including the steps of:

emitting from the first switch unit and the second switch unit, respectively, the radio frequency signals supplied from the first radio frequency output port and the radio frequency signals supplied from the second radio frequency output port; and reflecting, by the first switch unit and the second switch unit respectively, the radio frequency signals supplied from the first radio frequency output port and the radio frequency signals supplied from the second radio frequency output port back to the first radio frequency output port and the second radio frequency output port.

In the above technical solution, the first switch unit is used to make the first radio frequency output port short-circuited or open, so as to produce the reflection; and the second switch unit is used to make the second radio frequency output port short-circuited or open, so as to produce that reflection.

Compared to the transmission circuit for radio frequency signals in the prior art, the transmission circuit for radio frequency signals provided by the present invention omits the complicated transmitting antenna shift switch and the related links in the prior art, and adds respectively in the circuit a switch unit to each of the two radio frequency output ports of the power mixer. Such a switch unit only transmits the radio frequency signals outputted from the corresponding radio frequency output port to the subsequent devices, or reflects the radio frequency signals back to the corresponding radio frequency output port so that the power mixer outputs from its dummy load port the reflected power. Since the two switch units and their connection relationship in the transmission circuit for radio frequency signals according to the present invention are much simpler than the transmitting antenna shift switch in the prior art, the present invention reduces the complexity of the circuit. Moreover, by utilizing the simple switch unit in place of the complicated transmitting antenna shift switch, the present invention also reduces the costs.

DESCRIPTION OF THE PREFERRED EMBODIMENTS

In order to make the object, technical solution and advantages of the present invention more apparent, the present invention will be further described in detail below using exemplary embodiments.

Figure 2:
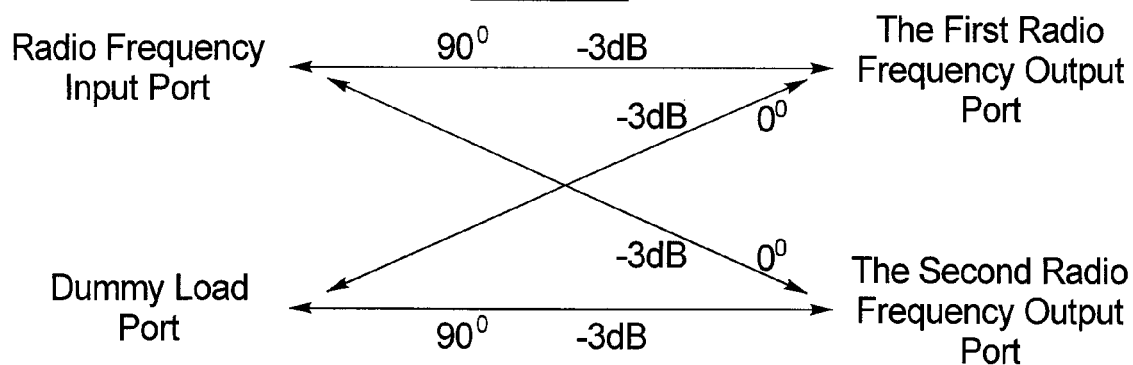
FIG. 2 is a schematic diagram of the power mixer of an embodiment according to the present invention.

First, the working principles of a power mixer in an embodiment according to the present invention will be described. FIG. 2 is a schematic diagram of the power mixer. As shown in FIG. 2, the power mixer comprises four ports, which are respectively a radio frequency input port (RF in), a first radio frequency output port (RF output1), a second radio frequency output port (RF output2) and a dummy load port (Dummy load). For the sake of simplicity, FIG. 2 does not provide particular internal structures of the power mixer; it shows the signal flows by lines and arrows.

Between the radio frequency input port and the first radio frequency output port, and between the second radio frequency output port and the dummy load port there are respectively odd number times of 90° phase shifts. Between the radio frequency input port and the second radio frequency output port, and between the first radio frequency output port and the dummy load port there are respectively even number times of 90° phase shifts. For the sake of simplicity, in the following description, a phase shift of 90° will be taken as an example the above odd number times of 90° phase shifts, and a phase shift of 0° will be taken as an example of the above even number times of 90° phase shifts.

It is well known that, power mixers can be divided into active power mixers or passive power mixers, the power mixer in the present invention can be either a passive power mixer or an active power mixer. In the case of using a passive power mixer, for the radio frequency signals which are supplied from the radio frequency input port, one half of the power each (approximately −3 dB) is transmitted to the first radio frequency output port or the second radio frequency output port. In the case of using an active power mixer, the radio frequency signals transmitted from the radio frequency input port to the first radio frequency output port and the second radio frequency output port will have the some gain, such as 2 dB gain, 5 dB gain, and so on. For the sake of simplicity, in the following description, the implementation of the embodiments according to the present invention are illustrated by means of passive power mixers as examples, the embodiments of the active power mixers are similar to that of the passive power mixers, so they need not be described herein redundantly.

As shown in FIG. 2, the radio frequency signals are inputted from the radio frequency input port, and one half the power each (approximately −3 dB) is transmitted to the first radio frequency output port or the second radio frequency output port, wherein, the radio frequency signals transmitted to the first radio frequency output port generate a phase shift of 90°, and the radio frequency signals transmitted to the second radio frequency output port generate a phase shift of 0°.

If there is a reflection coefficient k1 at the first radio frequency output port, then after the reflection, the power of the radio frequency signals which is equal to the product of k1 and the output power supplied from the first radio frequency output port will be reflected into the first radio frequency output port. For the radio frequency signals reflected from the first radio frequency output port, one half the power each (approximately −3 dB) is transmitted to the radio frequency input port or the dummy load port. The radio frequency signals transmitted to the radio frequency input port generate a phase shift of 90°, and the radio frequency signals transmitted to the dummy load port generate a phase shift of 0°.

Similarly, if there exists a reflection coefficient k2 at the second radio frequency output port, after the reflection, the power of the radio frequency signals which is equal to the product of k2 and the output power supplied from the second radio frequency output port will be reflected into the second radio frequency output port. For the radio frequency signals reflected from the second radio frequency output port, one half the power each (approximately −3 dB) is transmitted to the radio frequency input port or the dummy load port. The radio frequency signals transmitted to the radio frequency input port generate a phase shift of 0°, and the radio frequency signals transmitted to the dummy load port generate a phase shift of 90°.

At the dummy load port, the radio frequency signals reflected from the first radio frequency output port and the radio frequency signals reflected from the second radio frequency output port, compared to those supplied from the radio frequency input port, both have the phase shift of 90°, in other word, both are at the same phase; in addition. The powers of the two channels of the radio frequency signals are also the same. Therefore, the radio frequency signals reflected from the first radio frequency output port and the radio frequency signals reflected from the second radio frequency output port are superimposed and emitted as an output at the dummy load port. It is also possible to have reflection at the dummy load port, a part of the power will be reflected to the first radio frequency output port and the second radio frequency output port, but this part of the power has already been very small, and in the embodiments of the present invention, it will not be considered.

In the radio frequency input port, the radio frequency signals reflected from the first radio frequency output port and the radio frequency signals reflected from the second radio frequency output port, compared to those supplied from the radio frequency input port, have phase shifts of respectively 180° and 0°, in other word, these signals have a phase difference of 180°. The power of the two channels radio frequency signals is the same. Therefore, the radio frequency signals which are reflected from the first radio frequency output port and the radio frequency signals which are reflected from the second radio frequency output port cancel each other out at the radio frequency input port. Similarly, it is also possible to have reflection at the radio frequency input port, a part of the power will be reflected to the first radio frequency output port and the second radio frequency output port, but this part of the power has already been very small, and in the embodiments of the present invention, it will not be considered.

In summary, for the power mixer shown in FIG. 2, the power reflected from the first radio frequency output port and the power reflected from the second radio frequency output port cancel each other out at the radio frequency input port, and it is applied to the load connected at the dummy load port. In view of the overall effects, the power reflected from the first radio frequency output port and the power reflected from the second radio frequency output port are all outputted from the dummy load port, and there is no output coming from the radio frequency input port.

In summary, the power mixers in the embodiments of the present invention have the following features:

1) The radio frequency signals reflected from the first radio frequency output port and the second radio frequency output port to the radio frequency input port cancel each other out, namely, their power is the same, and their phase difference is an odd number times of 180°; and
2) the radio frequency signals reflected from the first radio frequency output port and the second radio frequency output port to the dummy load port are superimposed and then outputted, namely, and their phase difference is an even number times of 180°.

Figure 1:
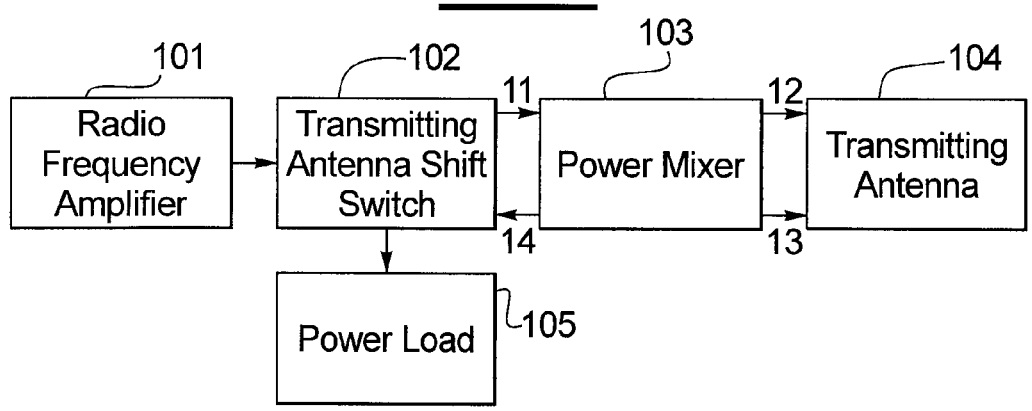
FIG. 1 is a schematic diagram of a transmitting link for the radio frequency signals in the prior art.
Figure 3:
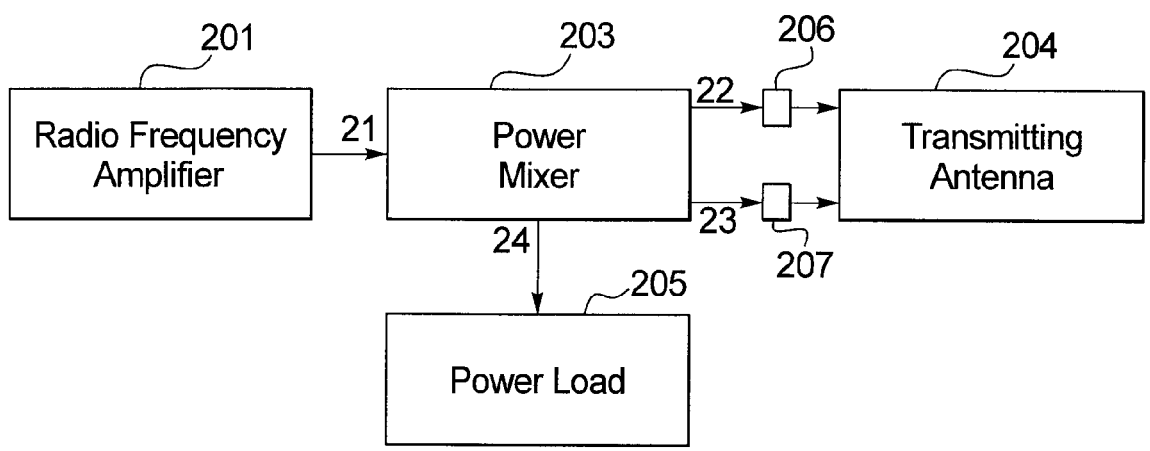
FIG. 3 is a schematic diagram of a transmitting link for the radio frequency signals in an embodiment according to the present invention.

FIG. 3 is a transmitting link of radio frequency signals of a body coil in the embodiment according to the present invention, it comprises: a radio frequency amplifier 201, a power mixer 203, a transmitting antenna 204, a power load 205, a first switch unit 206 and a second switch unit 207. Compared to the prior art in FIG. 1, this embodiment of the present invention removes the transmitting antenna shift switch 102, and adds the first switch unit 206 and the second switch unit 207.

Referring to FIG. 3, the first switch unit 206 and the second switch unit 207 are respectively connected to the first radio frequency output port 22 and the second radio frequency output port 23 of the power mixer 203. The first switch unit 206 and the second switch unit 207 can transmit directly the radio frequency signals supplied from the first radio frequency output port 22 and the second radio frequency output port 23 of the power mixer 203 to the transmitting antenna 204 behind them, or reflect respectively the radio frequency signals outputted from the first radio frequency output port 22 and the second radio frequency output port 23 of the power mixer 203 back to the first radio frequency output port 22 and the second radio frequency output port 23.

When the first switch unit 206 and the second switch unit 207 transmit the radio frequency signals supplied from the power mixer 203 to the transmitting antenna 204, the circuit is in its normal working conditions, and the radio frequency signals supplied from the radio frequency amplifier 201 are transmitted out by the transmitting antenna 204. When the first switch unit 206 and the second switch unit 207 reflect the radio frequency signals outputted from the power mixer 203 back to the power mixer 203, the reflected signals are outputted from the dummy load port of the power mixer to the power load 205, so that the radio amplifier 201 can calibrated by measurements.

The first switch unit 206 and the second switch unit 207 can be implemented in a variety of ways. Taking the first switch unit 206 as an example, when it is needed to transmit the radio frequency signals to the transmitting antenna 204, the first switch unit 206 transmits directly the radio frequency signals to the transmitting antenna 204; when it is needed to transmit to the power load 205, the first switch unit 206, by making the first radio frequency output port 22 short-circuited or open, can reflect the radio frequency signals outputted from the first radio frequency output port 22 back to the first radio frequency output port.

Figure 4:
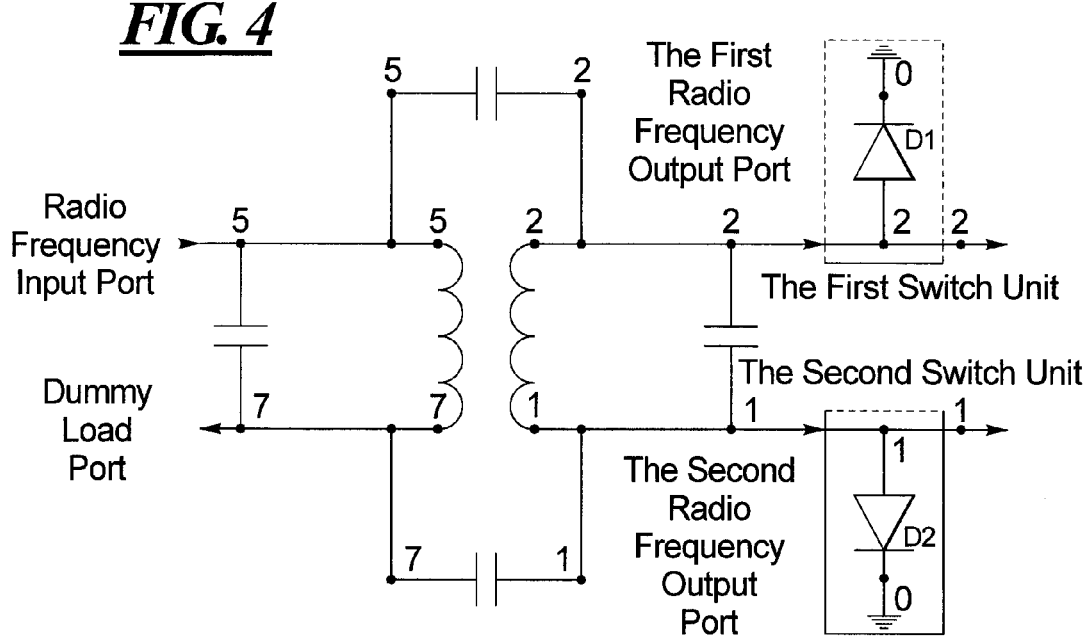
FIG. 4 is a schematic diagram of an embodiment of signal transmission circuit according to the present invention.

FIG. 4 provides a structural diagram for implementing the reflection by forming a short circuit. As shown in FIG. 4, the first switch unit comprises a diode D1, which diode D1 has its anode connected to the first radio frequency output port, and its cathode grounded. The second switch unit has a diode D2, which diode D2 has its anode connected to the second radio frequency output port, and its cathode grounded. When it is needed to transmit the radio frequency signals to the transmitting antenna, an appropriate negative voltage is applied to the anode of the diode D1 (node 2 shown in the figure) and the anode of the diode D2 (node 1 shown in the figure), so that the D1 and D2 are in their non-conducting state, the signals emitted from the first radio frequency output port and the second radio frequency output port will be transmitted to the transmitting antenna behind them. When it is needed to output from the dummy load port the radio frequency signals emitted from the power mixer, an appropriate positive voltage is applied to the anode of the diode D1 (node 2 shown in the figure) and the anode of the diode D2 (node 1 shown in the figure), so that the D1 and D2 are in their conductive state, the signals emitted from the first radio frequency output port and the second radio frequency output port will all be reflected back to the first radio frequency output port and the second radio frequency output port due to the connection to earth, and then be emitted as an output from the dummy load port.

The diode shown in FIG. 4 is only for the purpose of illustration. In this embodiment of the present invention, the way to realize the reflective switch unit is not limited to forming a short circuit. For example, the embodiment of the present invention can also use the way in which one end of the radio frequency switch is connected to the output port of the power mixer, and the other end is grounded, and there are also other ways to achieve the above function.

Figure 5:
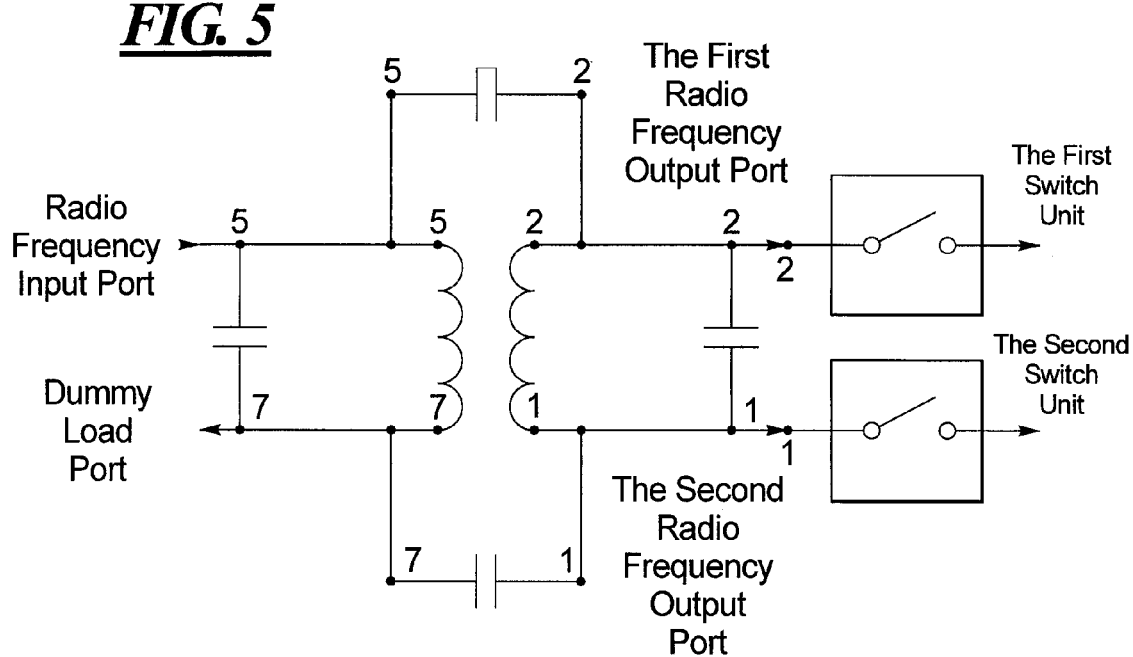
FIG. 5 is a schematic diagram of another embodiment of signal transmission circuit according to the present invention.

FIG. 5 shows a structural diagram for implementing reflection by forming an open circuit. The first switch unit and the second switch unit can be realized respectively by a radio frequency switch, both ends of the radio frequency switch in the first switch unit are respectively connected to the first radio frequency output port and one input end of the transmitting antenna, both ends of the radio frequency switch in the second switch unit are respectively connected to the second radio frequency output port and another input end of the transmitting antenna. When it is necessary to transmit the radio frequency signals to the transmitting antenna, the above two radio frequency switches will be closed, and the two channels of the radio frequency signals outputted from the power mixer are transmitted respectively to the transmitting antenna by way of the two closed radio frequency switches. When it is needed to transmit the radio frequency signals to the power load, the above two radio frequency switches will be broken and in an open state, then the two channels of the radio frequency signals outputted from the power mixer will be reflected respectively back to the first radio frequency output port and the second radio frequency output port due to the open circuit, and then be outputted from the dummy load port.

Similarly, the radio frequency switch shown in FIG. 5 is only for the purpose of illustration, and the switch unit of the present invention is not limited to this example. The radio frequency switch of the present invention can be an electro-mechanical switch realized by mechanical contacts, it can also be a radio frequency switch realized by a field-effect transistor (FET), it can further be a radio frequency switch realized by a diode of positive-intrinsic-negative (PIN) type, or any other radio frequency switch which is capable of achieving the above function.

Although modifications and changes may be suggested by those skilled in the art, it is the intention of the inventors to embody within the patent warranted hereon all changes and modifications as reasonably and properly come within the scope of their contribution to the art.

We claim as our invention:

1. A transmission circuit for radio frequency signals, comprising a power mixer, which the power mixer comprises a radio frequency input port, a first radio frequency output port, a second radio frequency output port and a dummy load port, wherein the radio frequency signals reflected back to the power mixer from the first radio frequency output port and radio frequency signals reflected back to the power mixer from the second radio frequency output port cancel each other out at said radio frequency input port, and are emitted from the dummy load port; the transmission circuit for radio frequency signals further comprising a first switch unit and a second switch unit, wherein,
   the first switch unit is connected to the first radio frequency output port for emitting the radio frequency signals outputted from the first radio frequency output port, or for reflecting the radio frequency signals outputted from the first radio frequency output port back to the first radio frequency output port; and
   the second switch unit is connected to the second radio frequency output port for emitting the radio frequency signals outputted from the second radio frequency output port, or for reflecting the radio frequency signals outputted from the second radio frequency output port back to the second radio frequency output port.

2. The transmission circuit for radio frequency signals as claimed in claim 1, characterized in that the first switch unit reflects the radio frequency signals outputted from the first radio frequency output port back to the first radio frequency output port by way a short circuit in the first radio frequency output port; and the second switch unit reflects the radio frequency signals outputted from the second radio frequency output port back to the second radio frequency output port by way of forming a short circuit in the second radio frequency output port.

3. The transmission circuit for radio frequency signals as claimed in claim 2, wherein said short circuit in the first switch unit and the second switch unit is realized by connecting to ground.

4. The transmission circuit for radio frequency signals as claimed in claim 3, wherein that the first switch unit comprises a diode, which diode has its anode connected to the first radio frequency output port and its cathode to ground, and when the diode is non-conducting, the radio frequency signals emitted from the first radio frequency output port are emitted, and when it is on, the radio frequency signals emitted from the first radio frequency output port are reflected back to the first radio frequency output port; and the second switch unit comprises a diode, which diode has its anode connected to the first radio frequency output port and its cathode to earth, and when the diode is cut off, the radio frequency signals from the second radio frequency output port are outputted, and when it is on, the radio frequency signals outputted from the second radio frequency output port are reflected back to the second radio frequency output port.

5. The transmission circuit for the radio frequency signals as claimed in claim 1, wherein the first switch unit reflects the radio frequency signals outputted from the first radio frequency output port back to the first radio frequency output port by way of making the first radio frequency output port an open circuit; and the second switch unit reflects the radio frequency signals outputted from the second radio frequency output port back to the second radio frequency output port by way of making the second radio frequency output port an open circuit.

6. The transmission circuit for radio frequency signals as claimed in claim 5, wherein the first switch unit comprises a radio frequency switch, which radio frequency switch has one side connected to the first radio frequency output port, when the radio frequency switch is closed, it outputs from the other side thereof the radio frequency signals outputted from the first radio frequency output port, and when it is open, it reflects the radio frequency signals outputted from the first radio frequency output port back to the first radio frequency output port; and the second switch unit comprises a radio frequency switch, which radio frequency switch has one side connected to the second radio frequency output port, when the radio frequency switch is closed, it outputs from the other side thereof the radio frequency signals emitted from the second radio frequency output port, and when it is open, it reflects the radio frequency signals emitted from the second radio frequency output port back to the second radio frequency output port.

7. The transmission circuit for radio frequency signals as claimed in claim 1, wherein the power supplied from the first radio frequency output port to the first switch unit and the power outputted from the second radio frequency output port to the second switch unit are equal, and the reflectance of the first switch unit and that of the second switch unit are equal; or, the power emitted from the first radio frequency output port to the first switch unit and the power emitted from the second radio frequency output port to the second switch unit are not equal, and the reflectance of the first switch unit and that of the second switch unit are not equal.

8. The transmission circuit for radio frequency signals as claimed in claim 1, wherein said power mixer is either an active power mixer or a passive power mixer.

9. The transmission circuit for radio frequency signals as claimed in claim 1, further comprises a radio frequency amplifier, a transmitting antenna and a power load, wherein, the output of said radio frequency amplifier is connected to the radio frequency input of said power mixer; the two inputs of said transmitting antenna are respectively connected to the first radio frequency output and the second radio frequency output of said power mixer; and said power load is connected to the port of dummy load of said power mixer.

10. A method for transmitting radio frequency signals by using a transmission circuit for radio frequency signals comprising a radio frequency input port, a first radio frequency output port, a second radio frequency output port and dummy load port, wherein radio frequency signals reflected back to the power mixer from the first radio frequency output port and radio frequency signals reflected back to the power mixer from the second radio frequency output port cancel each other at said radio frequency input port and are emitted from the dummy load port, said transmission circuit further comprising a first switch unit and a second switch unit, the method comprising the steps of:
  emitting from the first switch unit and the second switch unit respectively, the radio frequency signals emitted from the first radio frequency output port and the radio frequency signals outputted from the second radio frequency output port; and
  reflecting by the first switch unit and the second switch unit respectively the radio frequency signals emitted from the first radio frequency output port and the radio frequency signals emitted from the second radio frequency output port back to the first radio frequency output port and the second radio frequency output port.

11. The method as claimed in claim 10, comprising making the first radio frequency output port short-circuited or open by using the first switch unit, so as to realize said reflection; and making the second radio frequency output port short-circuited or open by using the second switch unit, so as to realize said reflection.

* * * * *